(12) United States Patent
Zhong et al.

(10) Patent No.: US 11,014,037 B2
(45) Date of Patent: May 25, 2021

(54) MEMBRANE METHOD PROCESSING SYSTEM AND PROCESS FOR HIGH-CONCENTRATION SALT-CONTAINING ORGANIC WASTE LIQUID INCINERATION EXHAUST GAS

(71) Applicant: JIANGSU JIULANG HIGH-TECH CO., LTD., Nanjing (CN)

(72) Inventors: Zhaoxiang Zhong, Nanjing (CN); Feng Zhang, Nanjing (CN); Junwei Wu, Nanjing (CN)

(73) Assignee: JIANGSU JIULANG HIGH-TECH CO., LTD., Nanjing (CN)

( * ) Notice: Subject to any disclaimer, the term of this patent is extended or adjusted under 35 U.S.C. 154(b) by 287 days.

(21) Appl. No.: 16/326,920

(22) PCT Filed: May 4, 2018

(86) PCT No.: PCT/CN2018/085582
§ 371 (c)(1),
(2) Date: Feb. 21, 2019

(87) PCT Pub. No.: WO2019/019759
PCT Pub. Date: Jan. 31, 2019

(65) Prior Publication Data
US 2019/0201830 A1    Jul. 4, 2019

(30) Foreign Application Priority Data

Jul. 27, 2017  (CN) .......................... 201710623019.5

(51) Int. Cl.
*B01D 46/54* (2006.01)
*B01D 53/78* (2006.01)
(Continued)

(52) U.S. Cl.
CPC ........... *B01D 46/543* (2013.01); *B01D 39/16* (2013.01); *B01D 39/1692* (2013.01);
(Continued)

(58) Field of Classification Search
CPC .............. B01D 46/543; B01D 46/0027; B01D 46/0071; B01D 46/4263; B01D 46/448;
(Continued)

(56) References Cited

FOREIGN PATENT DOCUMENTS

| CN | 205026683 U | * | 2/2016 |
| CN | 205174398 U | * | 4/2016 |

OTHER PUBLICATIONS

CN-205026683-U English translation (Year: 2016).*
CN-205174398-U English translation (Year: 2016).*

* cited by examiner

*Primary Examiner* — Anita Nassiri-Motlagh
(74) *Attorney, Agent, or Firm* — Treasure IP Group, LLC (57) ABSTRACT

A membrane method processing system and process for a high-concentration salt-containing organic waste liquid incineration exhaust gas is described. The system consists essentially of a waste liquid incinerator (I), a gas-solid separator (II), a heat exchanger (III), an air blower (IV), an anti-caking agent storage tank (V), a membrane method dust cleaner (VI), an induced draft fan (VII), a check valve (VIII), and a desulfurization tower (IX). The present invention introduces the dust collecting membrane into the tail gas treatment system and utilizes the small pore size and high porosity of the dust collecting membrane to prevent inorganic salt particles from entering the internal of the filter material and agglomerating there. When the humidity of the gas entering the dust collector increases during the dust removing process, the anti-caking agent is also introduced into the tail gas treatment system to change the surface
(Continued)

structure of the inorganic salt crystal to prevent the crystal from agglomeration.

10 Claims, 4 Drawing Sheets

(51) Int. Cl.
| | |
|---|---|
| *B01D 53/80* | (2006.01) |
| *B01D 46/00* | (2006.01) |
| *B01D 46/44* | (2006.01) |
| *B01D 46/46* | (2006.01) |
| *B01D 39/20* | (2006.01) |
| *B01D 39/16* | (2006.01) |
| *B01D 53/48* | (2006.01) |
| *F23G 7/00* | (2006.01) |
| *F23G 5/50* | (2006.01) |
| *F23G 5/08* | (2006.01) |
| *F23G 5/16* | (2006.01) |
| *B01D 46/42* | (2006.01) |
| *F23G 7/04* | (2006.01) |
| *F23J 15/00* | (2006.01) |
| *F23J 15/02* | (2006.01) |

(52) U.S. Cl.
CPC ..... *B01D 39/2068* (2013.01); *B01D 46/0027* (2013.01); *B01D 46/0071* (2013.01); *B01D 46/4263* (2013.01); *B01D 46/448* (2013.01); *B01D 46/46* (2013.01); *B01D 53/48* (2013.01); *B01D 53/78* (2013.01); *B01D 53/80* (2013.01); *F23G 5/08* (2013.01); *F23G 5/16* (2013.01); *F23G 5/50* (2013.01); *F23G 7/008* (2013.01); *F23G 7/04* (2013.01); *F23J 15/006* (2013.01); *F23J 15/022* (2013.01); *B01D 2239/065* (2013.01); *B01D 2239/1216* (2013.01); *B01D 2251/2062* (2013.01); *B01D 2251/304* (2013.01); *B01D 2251/404* (2013.01); *B01D 2251/606* (2013.01); *B01D 2251/608* (2013.01); *B01D 2257/30* (2013.01); *B01D 2273/20* (2013.01); *B01D 2275/10* (2013.01)

(58) Field of Classification Search
CPC .... B01D 46/46; B01D 39/16; B01D 39/1692; B01D 39/2068; B01D 53/78; B01D 53/80; B01D 2239/1216; B01D 2251/2062; B01D 2251/304; B01D 2251/404; B01D 2251/606; B01D 2251/608; B01D 2257/30; B01D 2273/20; B01D 2275/10
USPC .................................... 423/244.08
See application file for complete search history.

MEMBRANE METHOD PROCESSING SYSTEM AND PROCESS FOR HIGH-CONCENTRATION SALT-CONTAINING ORGANIC WASTE LIQUID INCINERATION EXHAUST GAS

CROSS REFERENCE TO RELATED APPLICATION

This application is a national stage application of a PCT application PCT/CN2018/085582, May 4, 2018, entitled "MEMBRANE METHOD PROCESSING SYSTEM AND PROCESS FOR HIGH-CONCENTRATION SALT-CONTAINING ORGANIC WASTE LIQUID INCINERATION EXHAUST GAS," which further takes priority of a Chinese application 201710623019.5, filed on Jul. 17, 2017. The international application and Chinese priority application are incorporated herein by reference in their entireties.

TECHNICAL FIELD

The present invention relates to a membrane system and process for the treatment of the incineration tail gas of high-concentration salt-containing organic waste liquid, particularly relating to a membrane system and process designed to prevent salt in the tail gas from agglomerating during the tail gas treatment process. It belongs to the waste liquid incineration tail gas purification field.

BACKGROUND TECHNOLOGY

High-concentration salt-containing organic waste liquid widely exists in urban domestic sewage treatment, pharmaceutical, chemical and fermenting processes. At present, the common treatment method of high-concentration salt-containing organic waste liquid is incineration. The incineration tail gas is discharged after being treated with desulfurization, denitrification and dust removal processes. The dust in the incineration tail gas of high-concentration salt-containing organic waste liquid is mainly inorganic salt. After the temperature of the tail gas is lowered through the heat exchanger, the inorganic salt is easily agglomerated in the subsequent dust removal equipment and pipeline, affecting the tail gas treatment effect. After a large amount of inorganic salt is agglomerated in the dust removal equipment, the running resistance is increased and the dust removal equipment needs to be cleaned regularly. This increases the cost of tail gas treatment, and the waste water generated during the cleaning process causes secondary pollution.

The main dust removal equipment in the treatment of the incineration tail gas of high-concentration salt-containing organic waste liquid is a bag-type dust collector. The boxes of the existing bag-type dust collector are mostly square. When inorganic salt enters the bag-type dust collector during the dust removal process, it can easily accumulate and agglomerate at the edges and corners inside the dust collector for a long time. The intergrowth of inorganic salt crystals trapped by the bag during the vacuum suction process causes intergranular adhesions. During the crystal forming process, due to the movement of soluble ions to the particle surface, numerous cavities are formed inside the particle. The crystals on the surface of the cavities are the same as the crystals on the surface of the particle. If the humidity in the gas is high, the crystallization range will gradually increase. Under the vacuum suction action, crystals enter the interior of the bag filter material and agglomerate inside the filter material, causing the whole bag to become hard and brittle, thus sharply shortening the service life of the bag.

SUMMARY OF THE INVENTION

The purpose of the present invention is to solve the following problems: (1) the massive agglomeration of inorganic salt in the dust removal equipment during the process of treating the incineration tail gas of high-concentration salt-containing organic waste liquid results in an increase in the running resistance; and (2) the crystallization of inorganic salt trapped by the bag during the vacuum suction process on the surface of the bag and inside the filter material causes the bag to become hard and brittle and thus shortens the service life of the bag. The present invention introduces the dust collecting membrane into the tail gas treatment system and utilizes the small pore size and high porosity of the dust collecting membrane to prevent inorganic salt particles from entering the internal of the filter material and agglomerating there. When the humidity of the gas entering the dust collector increases during the dust removing process, the anti-caking agent is also introduced into the tail gas treatment system to change the surface structure of the inorganic salt crystal to prevent the crystal from agglomeration. At the same time, the structure of the dust collector is designed to be cylindrical, so as to reduce edges and corners inside the dust collector and prevent the inorganic salt from accumulating and agglomerating at the edges and corners inside the dust collector for a long time. Inside the dust collector, an insulating and heating device is installed. The gas containing inorganic salt enters the interior of the dust collector along the tangential direction of the box and swirls along the inner wall of the dust collector under the action of the centrifugal force and is heated by the heating device, further reducing the risk of agglomeration.

Figure 5:
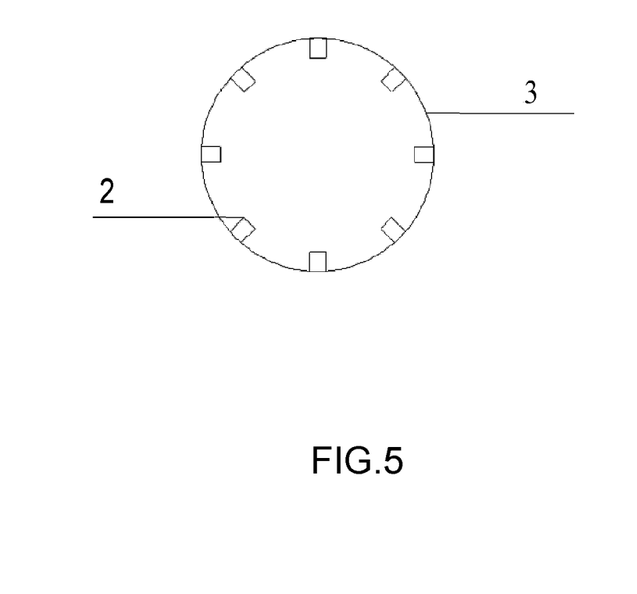

The technical scheme of the present invention: A membrane system for the treatment of the incineration tail gas of high-concentration salt-containing organic waste liquid is composed of a waste liquid incinerator (I), a gas-solid separator (II), a heat exchanger (III), an air blower (IV), an anti-caking agent storage tank (V), a membrane dust collector (VI), an induced draft fan (VII), a one-way valve (VIII) and a desulfurization tower (IX); the above-mentioned membrane dust collector (VI) has a cylindrical shape and includes the following components: temperature and humidity sensors (1), anti-caking agent nozzle(s) (2), a membrane dust collector inlet (3), the dust collecting membrane (4), a pore board (5), an ash bucket (6), a middle box (7), an upper box (8), an insulating and heating device (9) and a backflush device (10); the temperature and humidity sensors (1) and the anti-caking agent nozzle (2) are placed in the membrane dust collector inlet (3), the temperature and humidity sensors (1) are placed in front of the anti-caking agent nozzle (2), the anti-caking agent storage tank (V) is connected to the anti-caking agent nozzle (2) through the conveying pipe, the membrane dust collector inlet (3) is placed in the tangential direction of the middle box (7), the pore board (5) is placed between the middle box (7) and the upper box (8), and the dust collecting membrane (4) is arranged in a concentric circle on the pore board (5); the backflush device (10) is located at the upper part of the pore board (5) and is composed of multiple semicircular annular blowpipes (11), and the semicircular annular blowpipes (11) are connected to the air supply conduit (12), the insulating and heating device (9) is located in the middle box (7), and the ash bucket (6) is located in the lower part of the middle box (7) and is conical.

Wherein the above-mentioned anti-caking agent nozzle (2) is one or more; if there are several anti-caking agent nozzles (2), they are evenly arranged annularly in the membrane dust collector inlet (3); and the anti-caking agent nozzle (2) is opened or closed manually or automatically.

Figure 2:
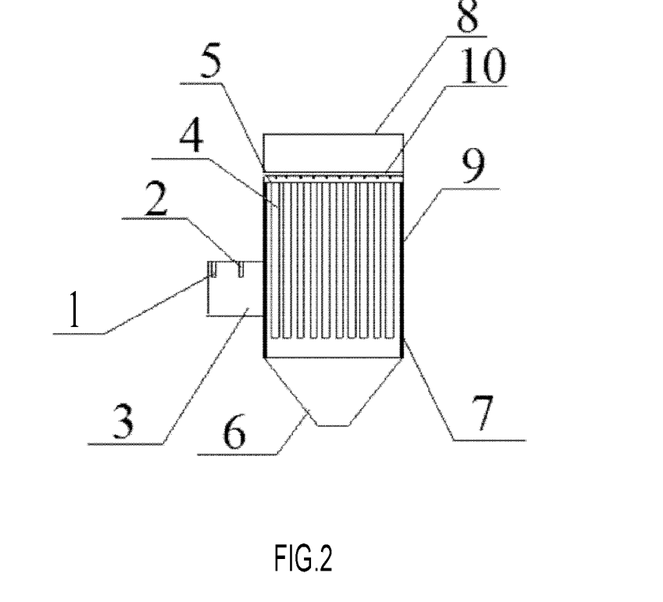
Figure 3:
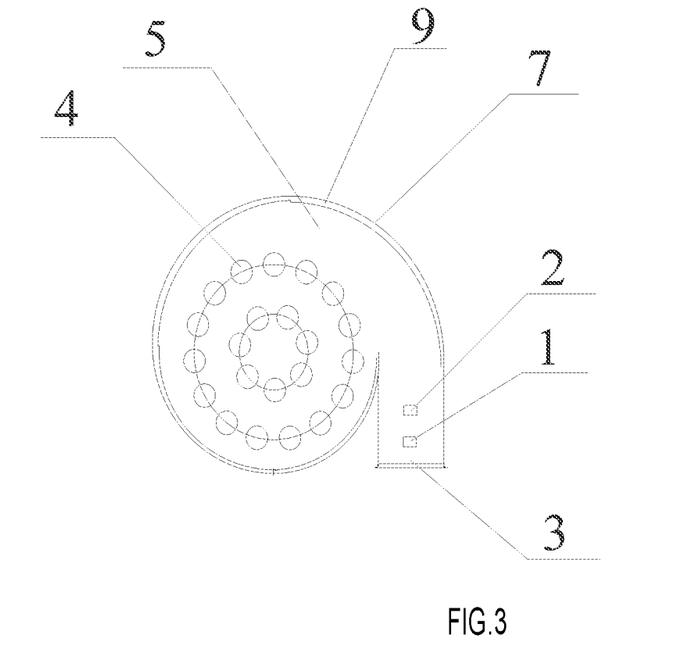

The pore board (5) has holes, the holes have a diameter of 10-200 mm, the distance between the centers of every two holes is 14-400 mm, and the above-mentioned dust collecting membrane (4) is installed in the holes of the pore board. The dust collecting membrane (4) is an organic membrane or an inorganic membrane and has a two-layer structure, including a support layer and a membrane layer; the support layer has a pore size of 10~200 μm, the membrane layer has a pore size of 1~10 μm, and the membrane layer has a thickness of 10~100 μm. The organic membrane has a thickness of 0.4~5 mm; the support layer material is glass fiber, polyester, polyphenylene sulfide, polyimide or polytetrafluoroethylene; the membrane material is polytetrafluoroethylene; the inorganic membrane is 3~50 mm thick and its material is ceramic or metal; the ceramic material is alumina, zirconia or silicon carbide, and the metal material is stainless steel, nickel, iron chrome alloy or titanium.

Figure 4:
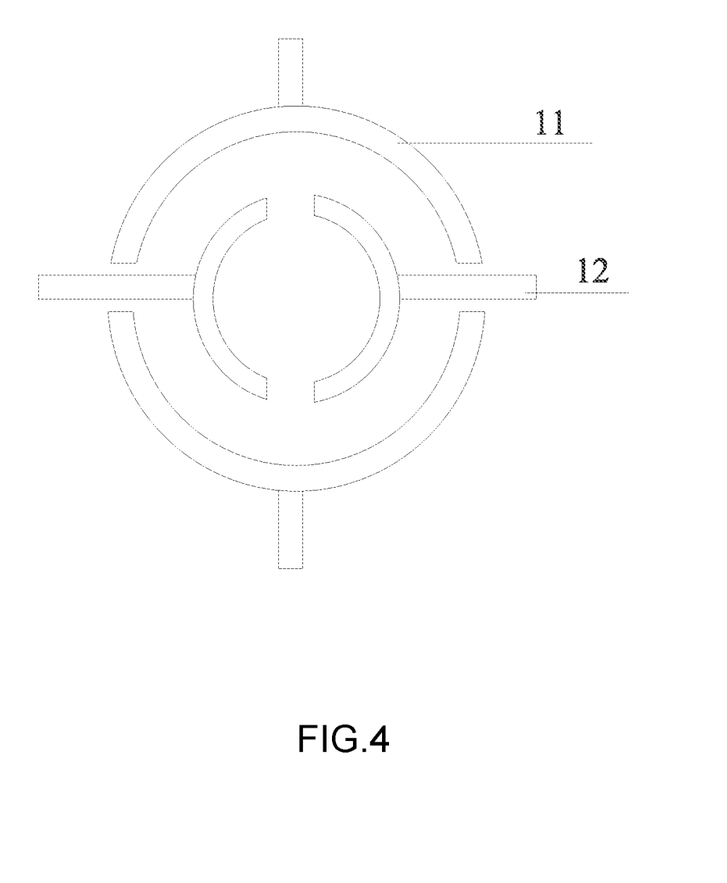

The semicircular annular blowpipe (11) is equipped with a blowing nozzle, and the center of the blowing nozzle is vertically aligned with the center of the pore board; and the dust collecting membrane (4) is reversely blown by the blowing nozzle when its filtration resistance is higher than the set value.

Figure 1:
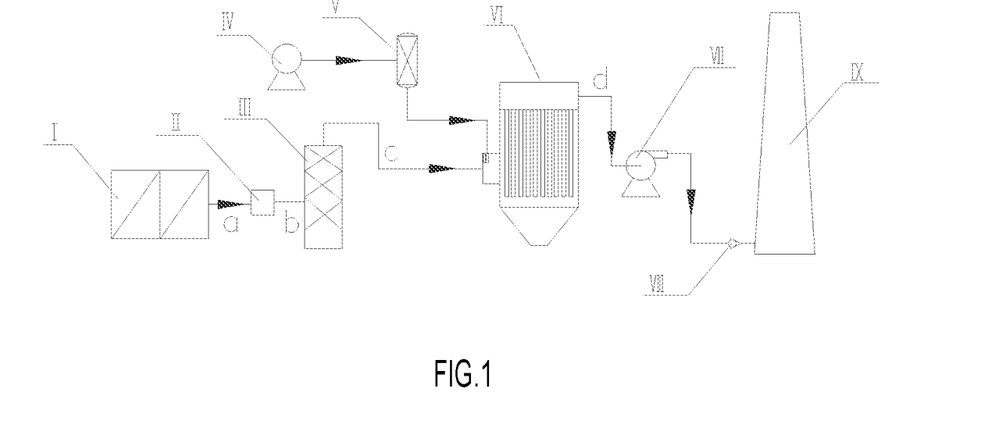

A membrane process for the treatment of the incineration tail gas of high-concentration salt-containing organic waste liquid includes the following steps:

(A) The high-temperature and high-concentration dust-containing gas (a) discharged from the waste liquid incinerator (I) enters the gas-solid separator (II), and the high-temperature dust-containing gas (b) after some dust is removed enters the heat exchanger (III) to exchange heat; the dust-containing gas after heat exchange (c) enters the membrane dust collector (VI) for dust removal;

(B) The temperature and humidity sensors (1) detect the dust-containing gas entering the membrane dust collector inlet (3). When the humidity is greater than the set value, the blower (IV) is turned on to deliver the anti-caking agent stored in the anti-caking agent tank (V) into the anti-caking agent nozzle (2), and the anti-caking agent is uniformly ejected by the anti-caking agent nozzle (2); when the temperature is lower than the set value, the insulating and heating device (9) in the membrane dust collector (VI) is automatically turned on;

(C) The dust-free gas (d) purified by the membrane dust collector (VI) is discharged from the membrane dust collector. It flows into the desulfurization tower (IX) through the one-way valve and is vented after desulfurization.

The dust-containing gas (c) in Step (A) has a temperature of 40-800° C. when entering the membrane dust collector (VI); when the dust-containing gas (c) is filtered by the dust collecting membrane (4), the pressure difference across the membrane is 100-3000 Pa and the gas filtration rate is 0.5-2.0 m/min.

The anti-caking agent described in Step (B) is a powder solid and is composed of one or more of potassium ferrocyanide, sodium ferrocyanide, ammonium ferric citrate, tricalcium phosphate, ferrous tartrate and silica, talc, sodium dodecylbenzenesulfonate, and the powder has a particle size of 10-1000 μm.

The air blower (IV) mentioned in Step (B) can be manually turned on as needed to inject the anti-caking agent into the dust-containing gas (c) entering the membrane dust collector (VI), and it can also be manually closed as needed to stop the injection of the anti-caking agent.

The desulfurization tower (IX) described in Step (C) is a wet desulfurization tower, and the desulfurizer used by it is limestone—gypsum, ammonia, sodium carbonate, sodium bicarbonate, ammonium phosphate or magnesium oxide.

The beneficiary effect of the present invention: the present invention relates to a membrane system and process for the treatment of the incineration tail gas of high-concentration salt-containing organic waste liquid; it introduces the dust collecting membrane and the anti-caking agent into the tail gas treatment process and designs the dust collector box to be cylindrical, so as to prevent inorganic salt from agglomerating at the edges and corners inside the dust collector and preventing inorganic salt crystals from growing on the surface and inside of the filter material to cause the filter material to be hardened, thus prolonging the service life of the filter material, reducing the running resistance of the dust collector and saving costs.

BRIEF DESCRIPTION OF THE DRAWINGS

Diagram 1 illustrates the membrane system for the treatment of the incineration tail gas of high-concentration salt-containing organic waste liquid described in the present invention, wherein I—waste liquid incinerator, II—gas-solid separator, III—heat exchanger, IV—air blower, V—anti-caking agent storage tank, VI—membrane dust collector, VII—induced draft fan, VIII—one-way valve, and IX—desulfurization tower.

Diagram 2 illustrates the membrane dust collector described in the present invention, wherein 1—temperature and humidity sensors, 2—anti-caking agent nozzle, 3—membrane dust collector inlet, 4—dust collecting membrane, 5—pore board, 6—ash bucket, 7—middle box, 8—upper box, 9—insulating and heating device, 10—backflush device.

Diagram 3 shows the transverse profile of the membrane dust collector described in the present invention, wherein 1—temperature and humidity sensors, 2—anti-caking agent nozzle, 3—membrane dust collector inlet, 4—dust collecting membrane, 5—pore board, 7—middle box, 9—insulating and heating device.

Diagram 4 shows the top view of the backflush device described in the present invention, wherein 11—semicircular annular blowpipes, 12—the air supply conduit.

Diagram 5 shows the arrangement mode of anti-caking agent nozzles in the membrane dust collector inlet when there are multiple anti-caking agent nozzles as shown in the present invention, wherein 2—anti-caking agent nozzle, 3—membrane dust collector inlet.

DETAIL DESCRIPTION OF EMBODIMENTS

The present invention will be described in detail below with reference to specific implementation cases. The following implementation cases are only used to illustrate the present invention, but are not intended to limit the implementation scope of the present invention.

Implementation Case 1

A membrane system for the treatment of the incineration tail gas of high-concentration salt-containing organic waste liquid is composed of a waste liquid incinerator (I), a gas-solid separator (II), a heat exchanger (III), an air blower (IV), an anti-caking agent storage tank (V), a membrane dust collector (VI), an induced draft fan (VII), a one-way valve (VIII) and a desulfurization tower (IX); the above-mentioned membrane dust collector (VI) has a cylindrical shape and includes the following components: temperature and humidity sensors (1), anti-caking agent nozzle(s) (2), a membrane dust collector inlet (3), the dust collecting membrane (4), a pore board (5), an ash bucket (6), a middle box (7), an upper box (8), an insulating and heating device (9) and a backflush device (10); the temperature and humidity sensors (1) and the anti-caking agent nozzle (2) are placed in the membrane dust collector inlet (3), the temperature and humidity sensors (1) are placed in front of the anti-caking agent nozzle (2), the anti-caking agent storage tank (V) is connected to the anti-caking agent nozzle (2) through the conveying pipe, the membrane dust collector inlet (3) is placed in the tangential direction of the middle box (7), the pore board (5) is placed between the middle box (7) and the upper box (8), and the dust collecting membrane (4) is arranged in a concentric circle on the pore board (5); the backflush device (10) is located at the upper part of the pore board (5) and is composed of multiple semicircular annular blowpipes (11), and the semicircular annular blowpipes (11) are connected to the air supply conduit (12), the insulating and heating device (9) is located in the middle box (7), and the ash bucket (6) is located in the lower part of the middle box (7) and is conical.

The number of the anti-caking agent nozzle (2) is one, and the anti-caking agent nozzle (2) is opened or closed automatically. The pore board (5) has holes, the holes have a diameter of 10 mm, the distance between the centers of every two holes is 14 mm, and the dust collecting membrane (4) is installed in the holes of the pore board. The dust collecting membrane (4) is a two-layer organic membrane, including a support layer and a membrane layer; the support layer has a pore size of 10 µm, the membrane layer has a pore size of 1 µm, and the membrane layer has a thickness of 10 µm; the organic membrane has a thickness of 0.4 mm; the support layer material is polyester, and the membrane material is polytetrafluoroethylene. The membrane dust collector (VI) has a backflush system, which will reversely blow the dust collecting membrane (4) when the filtration resistance is above the set value.

The specific operation process is as follows:
(A) The high-temperature high-concentration dust-containing gas (a) discharged by the waste liquid incinerator (I) flows into the gas-solid separator (II). After part of the dust is separated, the high-temperature dust-containing gas (b) flows into the heat exchanger (III) for heat exchange. After heat exchange, the dust-containing gas (c) flows into the membrane dust collector (VI) for dust removal. When the dust-containing gas (c) enters the membrane dust collector (VI), its temperature is 40° C. When the dust-containing gas c is filtered by the dust collecting membrane (4), the pressure difference across the membrane is 100 Pa, and the gas filtration rate is 0.5 m/min.
(B) The temperature and humidity sensors (1) detect the dust-containing gas entering the membrane dust collector inlet (3). When the humidity is greater than the set value, the air blower (IV) is automatically turned on to deliver anti-caking agent potassium ferrocyanide stored in the anti-caking agent storage tank (V) into the anti-caking agent nozzle (2). Potassium ferrocyanide has a particle size of 10 µm. The potassium ferrocyanide is evenly ejected by the anti-caking agent nozzle (2). When the temperature is lower than the set value, the insulating and heating device (9) in the membrane dust collector (VI) is automatically turned on.
(C) The dust-free gas (d) purified by the membrane dust collector (VI) is discharged from the membrane dust collector. It flows into the desulfurization tower (IX) via a one-way valve and is then vented after desulfurization. The desulfurization tower (IX) is a wet desulfurization tower, and the desulfurizer used is limestone-gypsum.

After the system has run stably for 8 months, it is found that the inorganic salt in the dust collector has no agglomeration, the surface of the dust collecting membrane has no inorganic salt aggregate, the running resistance is lower than 300 Pa, and the dust removal efficiency is higher than 99.9%.

Implementation Case 2

A membrane system for the treatment of the incineration tail gas of high-concentration salt-containing organic waste liquid has the same structure as implementation case 1. It has 5 anti-caking agent nozzles (2), which are arranged annularly in the membrane dust collector inlet (3). The pore board (5) has holes, the holes have a diameter of 200 mm, and the distance between the centers of every two holes is 400 mm. The dust collecting membrane (4) is a two-layer organic membrane, including a support layer and a membrane layer; the support layer has a pore size of 200 µm, the membrane layer has a pore size of 10 µm, and the membrane layer has a thickness of 100 µm; the organic membrane has a thickness of 5 mm; the support layer material is glass fiber, and the membrane layer material is polytetrafluoroethylene.

The specific operation process is as follows:
(A) The high-temperature high-concentration dust-containing gas (a) discharged by the waste liquid incinerator (I) flows into the gas-solid separator (II). After part of the dust is separated, the high-temperature dust-containing gas (b) flows into the heat exchanger (III) for heat exchange. After heat exchange, the dust-containing gas (c) flows into the membrane dust collector (VI) for dust removal. When the dust-containing gas (c) enters the membrane dust collector (VI), its temperature is 180° C. When the dust-containing gas c is filtered by the dust collecting membrane (4), the pressure difference across the membrane is 1500 Pa, and the gas filtration rate is 2.0 m/min.
(B) The temperature and humidity sensors (1) detect the dust-containing gas entering the membrane dust collector inlet (3). When the humidity is greater than the set value, the air blower (IV) is automatically turned on to deliver anti-caking agent tricalcium phosphate stored in the anti-caking agent storage tank (V) into the anti-caking agent nozzle (2). Tricalcium phosphate has a particle size of 1,000 µm. The tricalcium phosphate is evenly ejected by the anti-caking agent nozzle (2). When the temperature is lower than the set value, the insulating and heating device (9) in the membrane dust collector (VI) is automatically turned on.
(C) The dust-free gas (d) purified by the membrane dust collector (VI) is discharged from the membrane dust collector. It flows into the desulfurization tower (IX) via a one-way valve and is then vented after desulfurization. The desulfurization tower (IX) is a wet desulfurization tower, and the desulfurizer used is ammonia.

After the system has run stably for 24 months, it is found that the inorganic salt in the dust collector has no agglomeration, the surface of the dust collecting membrane has no inorganic salt aggregate, the running resistance is lower than 2000 Pa, and the dust removal efficiency is higher than 99.9%.

Implementation Case 3

A membrane system for the treatment of the incineration tail gas of high-concentration salt-containing organic waste liquid has the same structure as implementation case 1. It has 8 anti-caking agent nozzles (2), which are arranged annularly in the membrane dust collector inlet (3). The pore board (5) has holes, the holes have a diameter of 100 mm, the distance between the centers of every two holes is 200 mm, and the dust collecting membrane (4) is installed in the holes of the pore board. The dust collecting membrane (4) is a two-layer inorganic membrane, including a support layer and a membrane layer; the support layer has a pore size of 60 μm, the membrane layer has a pore size of 3 μm, and the membrane layer has a thickness of 20 μm. The inorganic membrane has a thickness of 3 mm; the membrane material is alumina. The membrane dust collector (VI) has a backflush system.

The specific operation process is as follows:

(A) The high-temperature high-concentration dust-containing gas (a) discharged by the waste liquid incinerator (I) flows into the gas-solid separator (II). After part of the dust is separated, the high-temperature dust-containing gas (b) flows into the heat exchanger (III) for heat exchange. After heat exchange, the dust-containing gas (c) flows into the membrane dust collector (VI) for dust removal. When the dust-containing gas (c) enters the membrane dust collector (VI), its temperature is 800° C. When the dust-containing gas c is filtered by the dust collecting membrane (4), the pressure difference across the membrane is 3000 Pa, and the gas filtration rate is 1.5 m/min.

(B) The temperature and humidity sensors (1) detect the dust-containing gas entering the membrane dust collector inlet (3). When the humidity is greater than the set value, the air blower (IV) is manually turned on to deliver anti-caking agent silica stored in the anti-caking agent storage tank (V) into the anti-caking agent nozzle (2). Silica has a particle size of 100 μm. The silica is evenly ejected by the anti-caking agent nozzle (2). When the temperature is lower than the set value, the insulating and heating device (9) in the membrane dust collector (VI) is manually turned on.

(C) The dust-free gas (d) purified by the membrane dust collector (VI) is discharged from the membrane dust collector. It flows into the desulfurization tower (IX) via a one-way valve and is then vented after desulfurization. The desulfurization tower (IX) is a wet desulfurization tower, and the desulfurizer used is sodium bicarbonate.

After the system has run stably for 12 months, it is found that the inorganic salt in the dust collector has no agglomeration, the surface of the dust collecting membrane has no inorganic salt aggregate, the running resistance is lower than 3500 Pa, and the dust removal efficiency is higher than 99.9%.

Implementation Case 4

A membrane system for the treatment of the incineration tail gas of high-concentration salt-containing organic waste liquid has the same structure as implementation case 1. It has 10 anti-caking agent nozzles (2), which are arranged annularly in the membrane dust collector inlet (3). The pore board (5) has holes, the holes have a diameter of 150 mm, the distance between the centers of every two holes is 300 mm, and the dust collecting membrane (4) is installed in the holes of the pore board. The dust collecting membrane (4) is a two-layer inorganic membrane, including a support layer and a membrane layer; the support layer has a pore size of 30 μm, and the membrane layer has a pore size of 5 μm. The inorganic membrane layer has a thickness of 20 μm. The membrane material is stainless steel. The membrane dust collector (VI) has a backflush system.

The specific operation process is as follows:

(A) The high-temperature high-concentration dust-containing gas (a) discharged by the waste liquid incinerator (I) flows into the gas-solid separator (II). After part of the dust is separated, the high-temperature dust-containing gas (b) flows into the heat exchanger (III) for heat exchange. After heat exchange, the dust-containing gas (c) flows into the membrane dust collector (VI) for dust removal. When the dust-containing gas (c) enters the membrane dust collector (VI), its temperature is 550° C. When the dust-containing gas c is filtered by the dust collecting membrane (4), the pressure difference across the membrane is 1800 Pa, and the gas filtration rate is 0.8 m/min.

(B) The temperature and humidity sensors (1) detect the dust-containing gas entering the membrane dust collector inlet (3). When the humidity is greater than the set value, the air blower (IV) is automatically turned on to deliver anti-caking agent sodium dodecylbenzenesulfonate (SDBS) stored in the anti-caking agent storage tank (V) into the anti-caking agent nozzle (2). SDBS has a particle size of 500 μm. The SDBS is evenly ejected by the anti-caking agent nozzle (2). When the temperature is lower than the set value, the insulating and heating device (9) in the membrane dust collector (VI) is manually turned on.

(C) The dust-free gas (d) purified by the membrane dust collector (VI) is discharged from the membrane dust collector. It flows into the desulfurization tower (IX) via a one-way valve and is then vented after desulfurization. The desulfurization tower (IX) is a wet desulfurization tower, and the desulfurizer used is sodium carbonate.

After the system has run stably for 10 months, it is found that the inorganic salt in the dust collector has no agglomeration, the surface of the dust collecting membrane has no inorganic salt aggregate, the running resistance is lower than 2500 Pa, and the dust removal efficiency is higher than 99.9%.

We claim:

1. A membrane system for treating incineration tail gas of a high-concentration salt-containing organic waste liquid is consisting essentially of a waste liquid incinerator (I), a gas-solid separator (II), a heat exchanger (III), an air blower (IV), an anti-caking agent storage tank (V), a membrane dust collector (VI), an induced draft fan (VII), a one-way valve (VIII) and a desulfurization tower (IX);

wherein the membrane dust collector (VI) in a cylindrical shape and includes the following components: temperature and humidity sensors (1), anti-caking agent nozzle(s) (2), a membrane dust collector inlet (3), the dust collecting membrane (4), a pore board (5), an ash bucket (6), a middle box (7), an upper box (8), an insulating and heating device (9) and a backflush device (10);

wherein the temperature and humidity sensors (1) and the anti-caking agent nozzle (2) are placed in the membrane dust collector inlet (3), the temperature and humidity sensors (1) are placed in front of the anti-caking agent nozzle (2), the anti-caking agent storage tank (V) is connected to the anti-caking agent nozzle (2) through the conveying pipe, the membrane dust collector inlet (3) is placed in the tangential direction of the middle box (7), the pore board (5) is placed between the middle box (7) and the upper box (8), and the dust collecting membrane (4) is arranged in a concentric circle on the pore board (5);

the backflush device (10) is located at the upper part of the pore board (5) and is composed of multiple semicircular annular blowpipes (11), and the semicircular annular blowpipes (11) are connected to the air supply conduit (12), the insulating and heating device (9) is located in the middle box (7), and the ash bucket (6) is located in the lower part of the middle box (7) and is conical.

2. The membrane system for treating incineration tail gas of high-concentration salt-containing organic waste liquid described in claim 1, wherein the anti-caking agent nozzle (2) is one or more; if there are several anti-caking agent nozzles (2), they are evenly arranged annularly in the membrane dust collector inlet (3); and the anti-caking agent nozzle (2) is opened or closed manually or automatically.

3. The membrane system for treating incineration tail gas of high-concentration salt-containing organic waste liquid described in claim 1 wherein the pore board (5) has holes, the holes have a diameter of 10~200 mm, a distance between centers of every two holes is 14~400 mm, and the dust collecting membrane (4) is installed in the holes of the pore board.

4. The membrane system for treating incineration tail gas of high-concentration salt-containing organic waste liquid described in claim 1 wherein the dust collecting membrane (4) is an organic membrane or an inorganic membrane and has a two-layer structure, including a support layer and a membrane layer; the support layer has a pore size of 10~200 μm, and the membrane layer has a pore size of 1~10 μm; the membrane layer has a thickness of 10~100 μm, and the organic membrane has a thickness of 0.4~5 mm; the support layer material is glass fiber, polyester, polyphenylene sulfide, polyimide or polytetrafluoroethylene; the membrane material is polytetrafluoroethylene; the inorganic membrane is 3~50 mm thick and its material is ceramic or metal; the ceramic material is alumina, zirconia or silicon carbide, and the metal material is stainless steel, nickel, iron chrome alloy or titanium.

5. The membrane system for treating incineration tail gas of high-concentration salt-containing organic waste liquid described in claim 1 wherein the semicircular annular blowpipe (11) is equipped with a blowing nozzle, and the center of the blowing nozzle is vertically aligned with the center of the pore board; and the dust collecting membrane (4) is reversely blown by the blowing nozzle when its filtration resistance is higher than the set value.

6. A process of treating incineration tail gas of high-concentration salt-containing organic waste liquid, comprising using the membrane system for the treatment of the incineration tail gas of high-concentration salt-containing organic waste liquid described in claim 1 to treat the incineration tail gas of high-concentration salt-containing organic waste liquid is comprised of following steps:

(A) allowing high-temperature and high-concentration dust-containing gas (a) discharged from the waste liquid incinerator (I) to enter the gas-solid separator (II), and allowing the high-temperature dust-containing gas (b) after some dust is removed to enter the heat exchanger (III) to exchange heat; allowing the dust-containing gas after heat exchange (c) to enter the membrane dust collector (VI) for dust removal;

(B) detecting the dust-containing gas entering the membrane dust collector inlet (3), by the temperature and humidity sensors (1); turning on the blower (IV) to deliver the anti-caking agent stored in the anti-caking agent tank (V) into the anti-caking agent nozzle (2) when the humidity is greater than a set value, and the anti-caking agent is uniformly ejected by the anti-caking agent nozzle (2);

turning on the insulating and heating device (9) in the membrane dust collector (VI) automatically when the temperature is lower than the set value;

(C) discharging the dust-free gas (d) purified by the membrane dust collector (VI) from the membrane dust collector by allowing the dust-free gas (d) flow into the desulfurization tower (IX) through the one-way valve and then allow it to be is after desulfurization.

7. The process for treating the incineration tail gas of high-concentration salt-containing organic waste liquid described in claim 6, wherein the dust-containing gas (c) in Step (A) has a temperature of 40~800° C. when entering the membrane dust collector (VI); when the dust-containing gas (c) is filtered by the dust collecting membrane (4), the pressure difference across the membrane is 100~3,000 Pa and the gas filtration rate is 5~2.0 m/min.

8. The process for treating the incineration tail gas of high-concentration salt-containing organic waste liquid described in claim 6, wherein the anti-caking agent described in Step (B) is a powder solid and is composed of one or more selected from potassium ferrocyanide, sodium ferrocyanide, ammonium ferric citrate, tricalcium phosphate, ferrous tartrate and silica, talc, sodium dodecylbenzenesulfonate (SDBS), and the powder has a particle size of 10~1,000 μm.

9. The process for treating the incineration tail gas of high-concentration salt-containing organic waste liquid described in claim 6, wherein the air blower (IV) described in Step (B) delivers the anti-caking agent to the anti-caking agent nozzle (2) automatically or manually.

10. The process for treating the incineration tail gas of high-concentration salt-containing organic waste liquid described in claim 6 the desulfurization tower (IX) described in Step (C) is a wet desulfurization tower, and the desulfurizer used therein is limestone-gypsum, ammonia, sodium carbonate, sodium bicarbonate, ammonium phosphate or magnesium oxide.

* * * * *